DISASTER WARNING SYSTEM

Filed May 29, 1956 5 Sheets-Sheet 1

INVENTORS
HAROLD W. STEWART
HORACE EDWARD RAILSBACK
BY Arlington C. White
ATTORNEY Dec. 1, 1959 H. W. STEWART ET AL 2,915,743

DISASTER WARNING SYSTEM

Filed May 29, 1956 5 Sheets-Sheet 2

INVENTORS
HAROLD W. STEWART
HORACE EDWARD RAILSBACK
BY
[signature]
ATTORNEY

DISASTER WARNING SYSTEM

Filed May 29, 1956 5 Sheets-Sheet 3

INVENTORS
HAROLD W. STEWART
HORACE EDWARD RAILSBACK
BY
Arlington C. White
ATTORNEY.

INVENTORS
HAROLD W. STEWART
HORACE EDWARD RAILSBACK
BY
[signature]
ATTORNEY

Fig. 13.
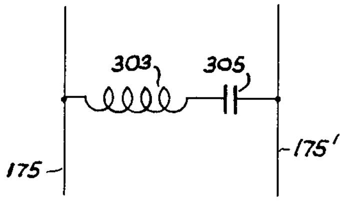
Fig. 15.
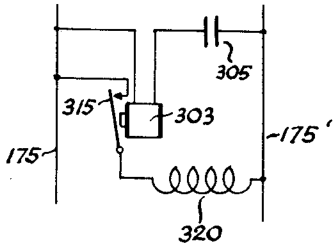
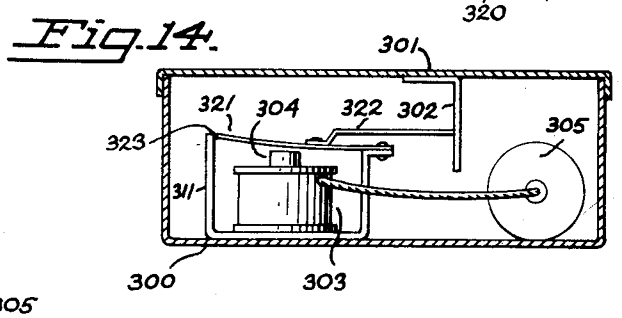
Fig. 16.
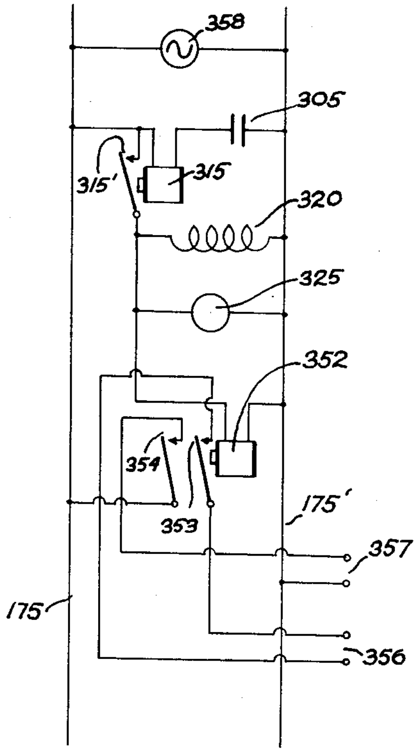
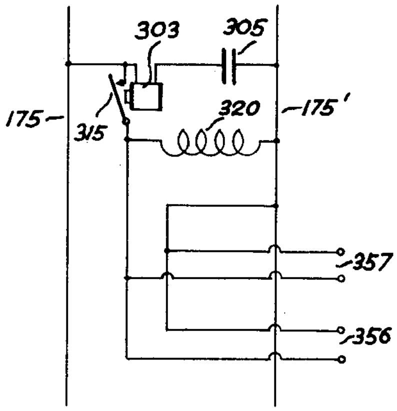
Fig. 17.
INVENTORS
HAROLD W. STEWART
HORACE EDWARD RAILSBACK
BY
Arlington C. White
ATTORNEY 2,915,743

DISASTER WARNING SYSTEM

Harold W. Stewart and Horace Edward Railsback, San Francisco, Calif.

Application May 29, 1956, Serial No. 588,037

9 Claims. (Cl. 340—310)

The invention, in general, relates to electrically operated signalling systems and more particularly relates to an improved disaster warning system for simultaneously warning and alerting a multiplicity of individuals whether in light or heavy concentration in homes, offices, industrial and commercial plants or the like of impending danger or disasters necessitating rapid dispersal of the individuals to other locations.

While our present system has been devised for operation either on existing telephone wires or cables, as well as upon existing power supply lines or combinations thereof, we have especially tested the system in connection with existing power supply lines and, accordingly, the invention will be described in such environment.

A primary object of our invention is to provide an improved disaster warning system which constitutes a component part of an existing power facility without affecting the operation of other electrical equipment connected into the existing power system.

Another important object of our present invention is to provide an improved disaster warning system of the indicated nature which is additionally characterized by the inclusion therein of audible or visible warning devices all operable at a predetermined frequency which is of a higher frequency than the normal 60 cycle frequency of an existing power system and which all can be connected into a conventional 110–120 volt or other voltage power circuit available in most homes, offices or plants.

A still further object of the invention is to provide an improved disaster warning system of the aforementioned character wherein the multiplicity of incorporated audio or visible signalling devices operate at extremely low wattage, and none of which devices is sensitive or responsive to the normal 60 cycle current of the existing power system to which the improved system is coupled, so that such devices all remain silent or inactivated under normal conditions.

Another important object of our present invention is to provide an improved disaster warning system which includes control means operable from a central location for imposing code signals on the system which are reflected simultaneously in the multiple signalling devices connected into the system.

A still further object of the present invention is to provide an improved disaster warning system of the aforementioned character which can operate a multiplicity of signalling devices in a multiplicity of locations simultaneously and which can be operated selectively to effect area by area warnings, rather than all signalling devices, whenever desired.

Another important object of the invention is to provide improved signalling devices for incorporation into our improved disaster warning system which are relatively inexpensive to manufacture and which require little maintenance.

Other objects of our invention, together with some of the advantageous features thereof, will appear from the following description of a preferred embodiment of our invention which is illustrated in the accompanying drawings. It is to be understood, however, that our invention is not to be limited to the precise embodiments shown, nor to the precise arrangement of the various parts thereof, nor to the specific signalling devices illustrated, as our invention, as defined in the appended claims, can be incorporated in a plurality and variety of forms and embodied in a plurality and variety of signalling devices for incorporation in the system.

Referring to the drawings:

Fig. 13 is a wiring diagram of a modified exemplification of signalling device shown in Fig. 14.

Fig. 14 is a sectional elevational view of a modified exemplification of signalling device usable with our preferred warning system, the electrical circuit for such exemplification being shown in Fig. 13.

Fig. 15 is a diagrammatic view in schematic showing of the electrical circuit of still another modified exemplification of signalling device usable in the preferred embodiment of our invention.

Fig. 16 is a diagrammatic view in schematic showing of the electrical circuit of another modified exemplification of signalling device usable in the preferred embodiment of our invention.

Fig. 17 is a diagrammatic view in schematic showing of the electrical circuit of still another modified exemplification of signalling device usable in the preferred embodiment of our invention.

In its preferred form, our improved disaster warning system preferably comprises, in combination with a conventional power transmission system, a high frequency carrier system coupled to said transmission system including means for superimposing a higher frequency low-voltage current on the said transmission system, together with means for applying any selected one of a plurality of pulsed or coded signals to said carrier system without interfering with normal operation of electrical translating devices connected into said transmission system, and a plurality of warning devices connected into said carrier system, all or selected groups of which are adapted to be activated simultaneously in response to signals applied to said carrier system but which are inoperable by the lower frequency current carried by said transmission system.

As is well known, electrical power transmitted from substations over most power distributing circuits in this country comprises relatively high voltage low frequency current, usually of 60 cycle frequency. The substation equipment constituting one component of our present improvement functions to superimpose on the customary high voltage 60 cycle current of these standard distributing circuits a low voltage higher frequency current to effect the operation of a multiplicity of electrical devices without affecting the transmission of the higher voltage 60 cycle current over such distributing circuits and thus without affecting the operation of translation devices connected into such power distributing circuits. The specially devised substation equipment forming a part of our improved disaster warning system, for installation in each one of a multiplicity of substations constituting parts of our modern electrical distribution systems, is diagrammatically and schematically illustrated in Fig. 1 of the annexed drawings and essentially comprises a rotary converter connected into an electrical circuit containing reactances and capacitances to effect an electrical coupling between the power distributing circuit at each substation and a carrier circuit which constitutes another component of our invention and which is hereinafter described.

Figure 1:
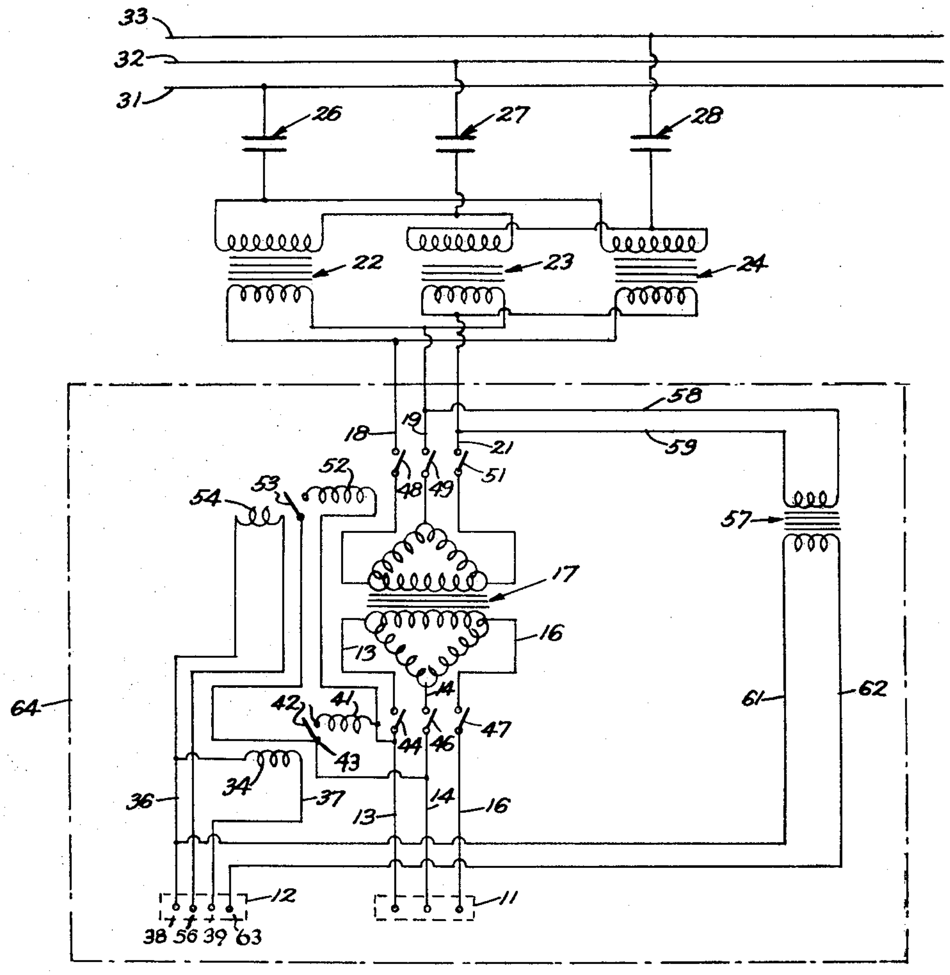
Fig. 1 is a schematic circuit diagram of one component of a preferred embodiment of our invention, as coupled to a conventional power circuit.

With particular reference to Fig. 1, it will be observed that the source of electrical energy for our circuit containing the rotary converter and the aforesaid resonance forming elements, is the 400 volt to 480 volt, 60 cycle current which is readily available at power substations; the coupling circuit including a power input terminal board 11, as well as a terminal strip 12 through which electrical connections are made over remote lines to similar terminals on the terminal strip of a control panel, hereinafter described. The power input is conducted over lines 13, 14 and 16 from input terminal board 11 to one side of a rotary converter 17 which conveniently may be a self-excited, single unit, induction frequency type rotating machine, the opposite side of converter 17 being connected by lines 18, 19 and 21 to the primaries of the series of coupling transformers 22, 23 and 24, respectively, the secondaries of which in turn are connected through coupling condensers 26, 27 and 28, respectively, to the 60 cycle bus lines, designated 31, 32 and 33, respectively, of the distributing circuit of any one substation.

The coupling circuit also includes a relay coil 34 which is connected across lines 36 and 37 leading from terminals 38 and 39 of terminal strip 12, a holding coil 41 having contacts 42 and 43 which are closed by the energization of relay 34 to energize holding coil 41 when terminals 38 and 39 are energized, together with a motor starting switch, such as a single throw three-pole switch having contacts 44, 46 and 47 connected into lines 13, 14 and 16, respectively, which is closed by the energization of holding coil 41 and thus supplies 440 volt to 480 volt, 60 cycle current to the rotary converter 17 inasmuch as lines 13, 14 and 16 are connected through input terminal board 11 to the source of supply of the 60 cycle current. The coupling circuit also includes a switch, which may be a single throw three-pole switch having contacts 48, 49 and 51 connected into lines 18, 19 and 21, respectively, leading from the output of converter 17, a holding coil 52 controlling the opening and closing of the contacts 48, 49 and 51 and connected across lines 13 and 14 of the power input through its contact switch 53 thereby being supplied with 440 volt to 480 volt 60 cycle current, together with a relay 54 for controlling the opening and closing of the contact switch 53 of holding coil 52; the relay 54 being connected across terminals 38 and 56 of terminal strip 12 and being pulsed in cadence with cam-driven switches through remote wires connected to terminals 38 and 56 of terminal strip 12, as hereinafter described. Included also in the coupling circuit is a transformer 57, the primary of which is connected by means of conductors 58 and 59 to the output of converter 17 across lines 19 and 21, respectively, to be energized by the energization thereof; the secondary of transformer 57 being connected by means of conductors 61 and 62 to the terminal 38 and a terminal 63 of terminal strip 12 which supply through remote wires a higher frequency reduced voltage current to corresponding terminals of a terminal strip and to the pilot lights of a pulsing device at a central control panel, as hereinafter described. The foregoing described substation installation, except the transformers 22, 23, and 24 as well as the condensers 26, 27 and 28 can be enclosed in a weather-proof and tamper-proof metal cabinet, designated in Fig. 1 by the reference numeral 64, occupying approximately 10 square feet of floor space in the substation.

Figure 2:
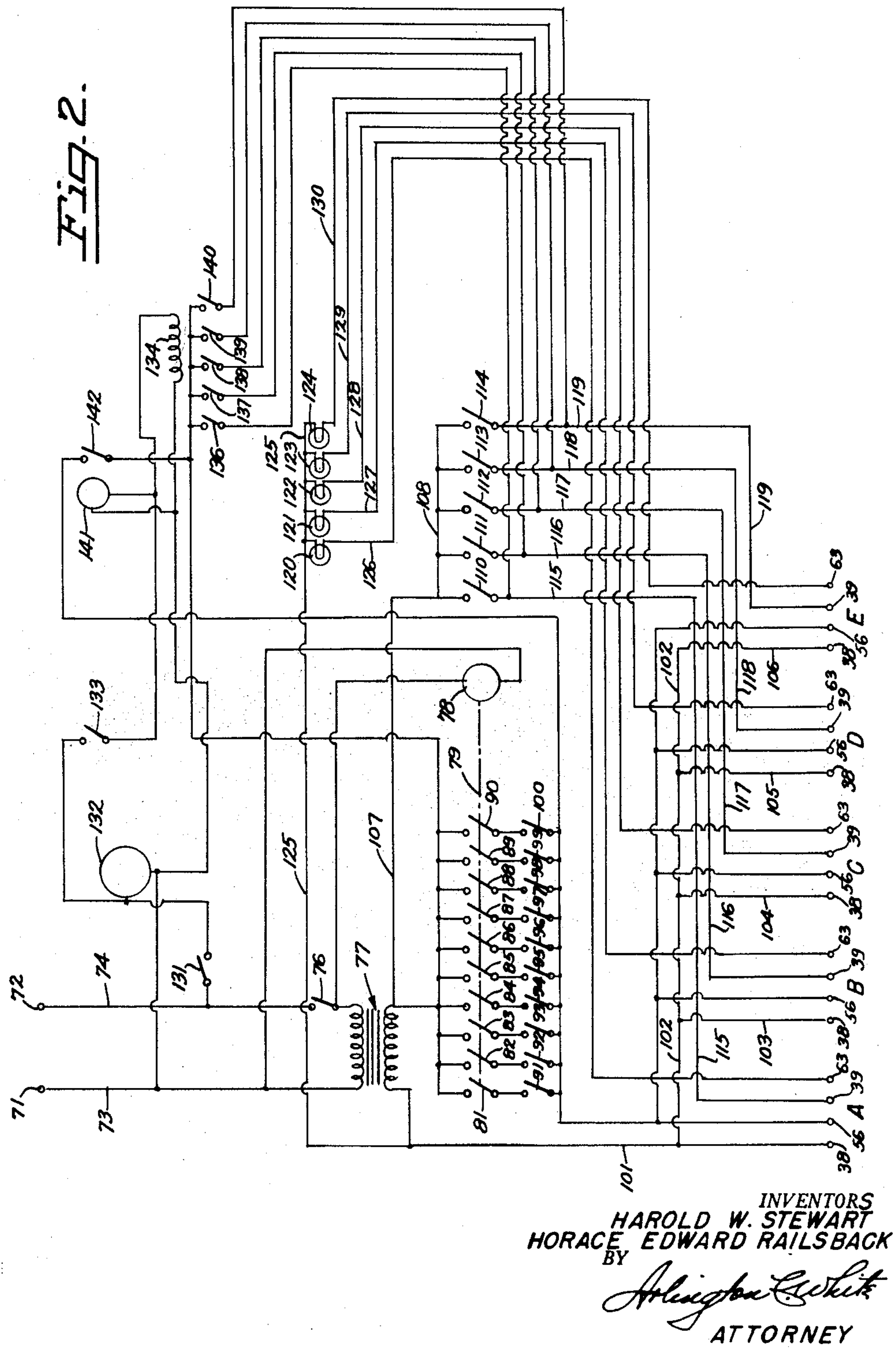
Fig. 2 is a schematic circuit diagram of a supervisory control system forming another component of a preferred embodiment of our invention.

In accordance with the present invention, we provide as another component of our disaster warning system a control and coding device which is illustrated diagrammatically and schematically in Fig. 2 of the annexed drawings; it being understood that one of these control and coding devices may be utilized for controlling a plurality of substation components of our invention. The electrical circuit of the control and coding unit is connected, as at supply terminals 71 and 72, to any 120 volt 60 cycle source of power transmitted over lines 73 and 74 and is rendered operable by a main key lock switch 76 connected in line 74; the circuit including a step-down transformer 77, the primary of which is connected across lines 73 and 74 for reducing the 120 volt 60 cycle supply to a voltage sufficiently low to maintain approximately 24 volts at the terminal strips 12 of the control cabinets 64 located in each of the various substations. Parenthetically, we may state that this maintenance of lower than 120 volts in this circuit is requisite since it is contemplated that telephone lines will be used as the connecting medium from a central station to a plurality of power substations, and it is planned to match the bell-ringing voltage used by each local telephone company. The control and coding unit is provided with a plurality of terminal strips, designated generally by the reference characters A, B, C, D, and E, etc., which may be infinite in number, the terminals of which are connected through remote wires, not shown, to corresponding terminals of the terminal strips 12 of the substation units; such terminals of the indicated strips of the control and coding unit bearing the corresponding reference numerals 38, 56, 39 and 63 as in the case of the terminals of terminal strip 12 of the substation component illustrated in Fig. 1.

The electrical circuit of the control and coding unit includes, in addition to the transformer 77, a signal pulsing motor 78 operable upon the closing of switch 76, a series of cams, not shown but indicated by the dot and dash lines 79 extending to the left of motor 78, a plurality of cam-driven switches of which but 10 are shown, designated by reference numerals 81 to 90, inclusive, although any required number of switches may be employed and connected into the circuit for actuation by the motor driven cams, and a series of selector switches 91 to 100, inclusive, connected in series with the cam-driven switches 81 to 90, respectively. The secondary of transformer 77 is connected across the terminals 38 and 39 of the series of terminal strips A, B, C, D and E by means of a conductor 101 leading from one side of the secondary to terminal 38 of terminal strip A, as well as a bus 102 and a series of short conductors 103, 104, 105 and 106 connecting the bus 102 to the terminals 38 of the strips B, C, D and E, respectively, and by means of a conductor 107 leading from the other side of the secondary of the transformer 77, as well as a bus 108, to and through a series of switches 110, 111, 112, 113 and 114 to the terminals 39 of terminal strips A, B, C, D and E over conductors 115, 116, 117, 118 and 119, respectively. It is to be understood that the switches 110 to 114, inclusive, are to be left closed at all times and that the converters in the various substations are energized and are ready for the service simultaneously with the closing of key lock switch 76. The switches 110–114, inclusive, have been provided in the coding and control circuits so that certain localities within a larger geographical area might be given a certain or a predetermined warning without disturbing the entire area; the number of switches for this purpose in some larger metropolitan areas might exceed one hundred. In order to have visual indication that the various circuits are operating with proper coded signals being flashed, we provide on the cabinet which houses the control and coding circuit, not shown, a plurality of pilot lamps 120–124, inclusive, which match the switches 110–114, inclusive, or a greater number if employed; the lamps 120–124 being connected by means of a lamp bus 125 together with conductors 126–130, inclusive, leading from lamps 120–124, respectively, to the terminal strips A to E, inclusive, at terminals 63 which connect these pilot lamps over remote wires with a portion of the circuit at each of the substations whereby the lamps are energized in cadence with the coded signals transmitted over the carrier circuit. The power for the lamps 120–124, in other words, is actually supplied from the higher frequency signal being superimposed on the 60 cycle bus at each of the substations; the lamp circuit being completed through terminals 38 and 63 of the terminal strips A to E, inclusive.

In accordance with the present invention, we provide in combination with the control and coding circuit an additional and entirely automatic circuit connected across lines 73 and 74 and including a key lock switch 131, and a clock mechanism 132 conveniently having a 24-hour movement which at noon or at any other time operates to close a switch 133. The automatic circuit also includes a relay 134, a plurality of switches 136, 137, 138, 139 and 140 that are controlled by relay 134, as well as a time-delay relay or motor 141 controlling a switch 142 which is in parallel with that portion of the coding and control circuit containing the signal selector switches 91–100, inclusive. The closing of switch 131 effects the energization of the 24-hour clock movement 132 which, at a predetermined time, closes switch 133 to effect, in turn, the energization of relay 134 which closes switches 136–140, inclusive, to automatically start the converters in each of the substations. Closing of switch 133 also starts the time-delay relay or motor 141, which is set for a time sufficient for the converters to reach full speed. At the lapse of a predetermined time, the switch 142 is closed by the action of time-delay motor 141 which, through the signal selector switches 91–100, inclusive, energizes the terminals 38 and 56 of terminal strips A to E, inclusive, and causes the selected signal to be superimposed on the 60 cycle bus at each of the substations. The coded signal thus flashed and superimposed on the 60 cycle bus is carried to the multiplicity of home, office and plant devices hereinafter described. Since switch 133 is a timed contact switch, it will open after the selected signal has been applied to the line for a short duration of time, thus causing relay 134 to deenergize the switches 136–140, inclusive, and also causing the timer 141 to open switch 142 which, in turn, deenergizes terminals 38 and 56 of the terminal strips A to E, inclusive. This cycle is repeated each 24-hour period so long as the key lock switch 131 is closed.

Figure 3:
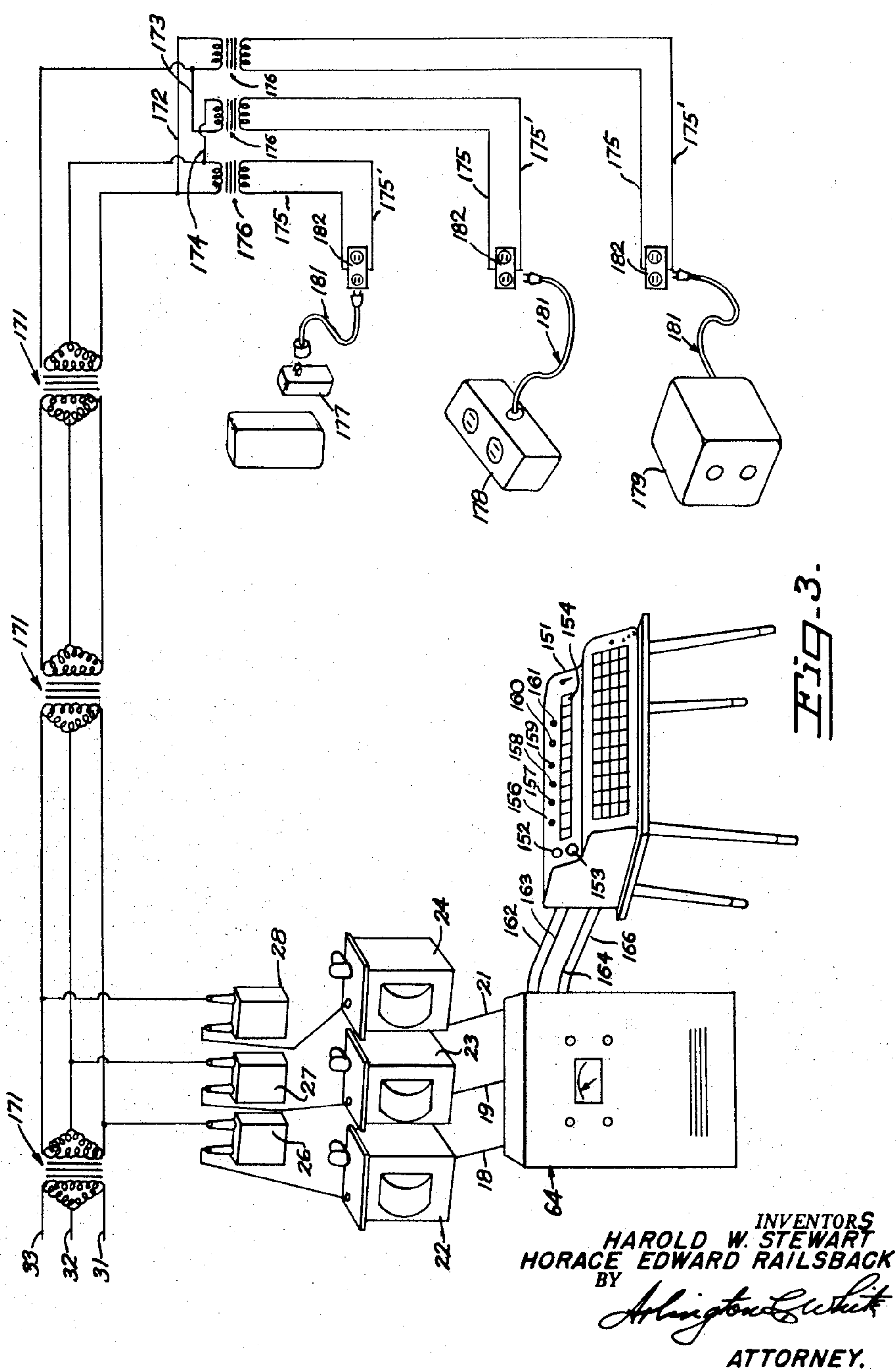
Fig. 3 is a diagrammatic and schematic composite view of the various components of our improved system including home warning devices.

In Fig. 3 of the annexed drawings, we have schematically shown a preferred embodiment of our invention with but one central control component, one substation component and but three of the typical signal receiving devices; it being understood that this restricted showing is primarily due to limitation of space and also that one central control component can function effectively in association with a plurality of substation components and that a multiplicity of signal receiving devices can be connected into the power distribution lines for simultaneously receiving the code signals superimposed upon the conventional power distribution lines by the combination of the central control and substation components of our improved system. As shown, the control and coding circuits may be compactly housed in a console or pulsing device 151 which can be conveniently provided with suitable push-buttons 152 and 153 on the front panel thereof for effecting the closing of key-lock switches 76 and 131 of the coding and control circuit, see Fig. 2. Suitable openings covered by glass panels 154 are provided in the front panel of the console 151 overlying the assembled pilot lights 120–124, etc., etc., so that the supervisor at the central station will be at all times advised with respect to the flashing of the coded signals over the system. In addition, the console 151 can be provided with a series of push-buttons for effecting the application of any selected one of a plurality of different types of code signals to the carrier circuit, when desired; said push-buttons being designated by the reference numerals 156–161, inclusive. The terminals 38, 56, 39 and 63 of the various terminal panels A, B, C, D and E of the control and coding circuit are connected to remote wires, such as the electrical conductors 162, 163, 164 and 166, respectively, as shown in Fig. 3, which in turn are connected to the corresponding terminals 38, 56, 39 and 63 of terminal strip 12 of the substation unit which is mounted on the cabinet 64. As hereinabove set forth, the output of the converter 17 which is housed in the cabinet 64 is carried over lines 18, 19 and 21 through a series of transformers 22, 23 and 24, as well as a series of condensers 26, 27 and 28 to the substation bus 31, 32 and 33 constituting the power distribution feeders so that the pulsed signal is translated to higher frequency low voltage current and carried to the high voltage 60 cycle bus at the substation and thence through the distribution feeders through transformers indicated at 171, as well as through lower voltage distribution feeders 172, 173 and 174 and additional transformers 176 to the subscribers' outlets constituting the receiving devices 177, 178 and 179 located in various occupied buildings throughout the system, including homes, office buildings and plants. These receiving devices 177, 178 and 179 are shown in Fig. 3 as unconnected to the system but provided with the conventional cord and plug 181 for connecting the devices to the outlets 182. Normally, these receiving devices are always connected into the outlet boxes 182 so that they will be in operative condition for receiving the coded signals superimposed upon the power distribution lines from the central control station regardless of the particular code signal being transmitted. It is understood, of course, that these receiving devices are so tuned to the higher frequency low voltage current being superimposed upon the power distribution system that they will only operate at such higher frequency low voltage current and will not be responsive to the conventional 60 cycle current normally carried over distribution lines.

Figures 4, 5, 6, 7, 8:
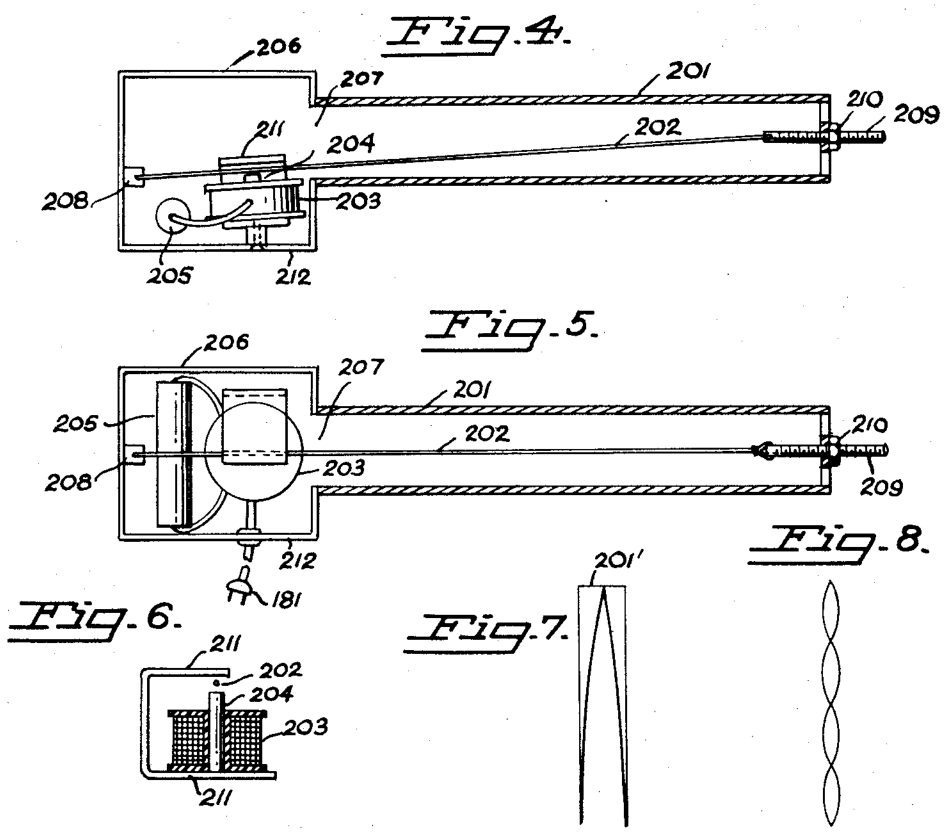
Fig. 4 is a longitudinal sectional view of a preferred exemplification of a signalling device employed in a preferred embodiment of the invention.
Fig. 5 is a top plan view of the device shown in Fig. 4.
Fig. 6 is a fragmentary cross-sectional detail of an element of the device illustrated in Figs. 4 and 5.
Fig. 7 is a sectional elevation of the resonator of the device of Fig. 4, illustrative of the manner of determining resonating length.
Fig. 8 is a typical sound wave pattern.

In accordance with our invention we provide specially constructed signalling devices for connection into our improved system and for receiving the superimposed coded signals in various types of buildings and locations, such as homes, offices and industrial plants. A preferred exemplification of signalling device incorporated into our improved disaster warning system is depicted in Fig. 4 of the annexed drawings and preferably comprises an assembly of three resonant components including an elongated tube or hollow box 201 which can be fabricated of a lightweight metal, such as aluminum or an aluminum alloy and which constitutes one resonant component, together with a length 202 of piano wire or tensional string as a second resonant component, and an electrical resonant circuit consisting of a winding 203 having an iron core 204 and forming the reactance of the circuit, as well as a capacitor 205 of the proper capacity to render the circuit resonant at the higher frequency of the carrier circuit, hereinabove described, and which is associated with the conventional power transmission lines upon which the coded signals at said higher frequency are superimposed. The tube 201, it is to be understood, is made of sufficient dimensions to house a portion of the elements of the resonant circuit, as well as the tensional piano wire 202 and is made to a length equal to the proper fraction of the wave length of the fundamental tone of higher frequency, as well as of the fundamental tone of the tensional string 202 and of the frequency of the resonant electrical circuit. With the tube or box 201 so tuned, it will resonate at the fundamental tone or frequency and, consequently, a vibration of this frequency set upon the box 201 will build up the feeble or minute energy applied to the aforesaid electrical resonant circuit to an extremely large amplitude.

In accordance with our invention, as embodied in a preferred exemplification of a signalling device which is connected into the system, we provide a box-like structure 206 having an open front and an opening 207 in one side wall thereof to which the tube 201 is attached in any well-known manner such as by welding or by means of suitable metal screws, not shown. At one side of the box 206 we provide a clamp 208 having an aperture therethrough for receiving one looped end of the wire 202 in order to secure the same thereto; the other looped end of wire 202 passing through a transverse hole in the inner end of a threaded rod 209 which extends through the remote end of the tube 201, as shown in Fig. 4. A nut 210 is threaded onto the rod 209 for bearing engagement against the outer surface of the end of the tube 201 and serves to place greater or less tension on the wire 202 as desired. We so locate the components of the above-mentioned electrical resonant circuit within the box 206 and in relation to the tube 201 that they lie within any one of the harmonics of the tensional string or wire 202 in order to take advantage of the phenomenon of a vibrating string. To this end, we affix a yoke 211 to the base 212 of the box 206 adjacent to its wall opening 207, through which the tensional string 202 passes, and mount the driving device consisting of the winding 203 and its iron core 204 on the yoke 211 so as to define an air gap between the top leg of the yoke and the top of iron core 204 in which the tensional string 202 lies when at rest, see particularly Figs. 4 and 6 of the drawings. In vibrating condition, this location of the driving components of the electrical resonant circuit are in the closest proximity to the loop of the harmonic wave; it being understood that the node of the wave stays approximately in line with the tensional string 202 when at rest and reference is made to Fig. 8 of the drawings for an illustration of the sound wave. Locating the driving components in this position gives the greatest vibration to the tensional string 202 and, consequently, the highest possible decibel level output with a given power input through winding 203.

Figures 10, 11:
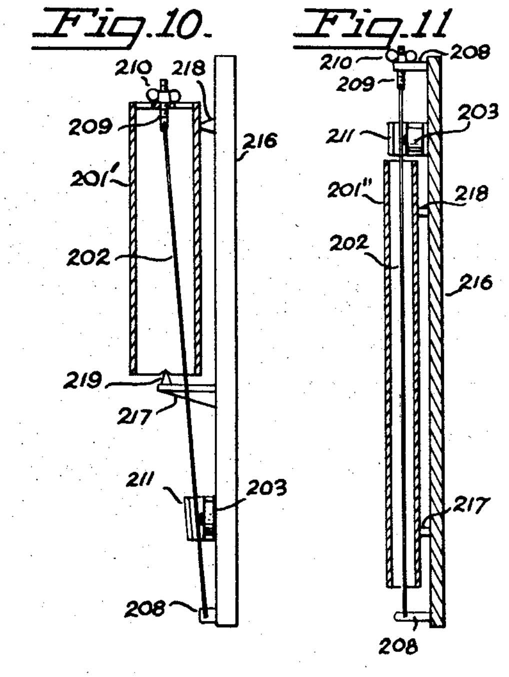
Fig. 10 is a side-elevational view of a modified embodiment of the exemplification of signalling device shown in Figs. 4 and 5.
Fig. 11 is a side-elevational view of still another modification of the exemplification of signalling device shown in Figs. 4 and 5.

In Fig. 10 of the annexed drawings, we have illustrated a modified exemplification of the signalling device shown in Figs. 4–6, inclusive. In the exemplification of Fig. 10, the tube 201′ is made to a length equal to ¼ of the wave length of the fundamental tone of the frequency superimposed on the power transmission line, or of the fundamental tone of the tensional string 202 and the frequency of the resonant electrical circuit consisting of the components 203, 204 and 205. In other words, the tube 201′ will resonate at ¼ of the fundamental tone or frequency and a vibration of this frequency will build up to an extremely large amplitude the feeble or minute energy applied to the electrical resonant circuit. The box or tube 201′ can readily be supported in spaced relationship to a base 216 by means of fixed supports 217 and 218, the former support carrying a detent 219 fitting into a notch 220 formed in one end of the tube. The clamp 208 for attaching one end of tensional string 202 is fixed to the base 216, and a wing-nut 210 is threaded onto the rod 209 for engaging the outer surface of the remote end of the tube and serving to increase or decrease the tension of the spring 202; the driving components being supported on base 216 approximately midway between the clamp 208 and the adjacent end of the tube 201′ for giving the greatest vibration to the wire or string 202.

Figure 12:
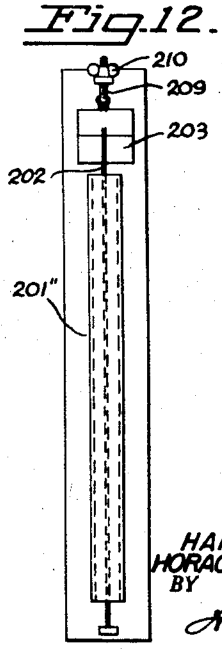
Fig. 12 is a top plan view of the modified signalling device shown in Fig. 11.

A somewhat similar arrangement can be effected with a tube length of one-half of the fundamental tone of the frequency superimposed upon the power transmission line, such a tube being illustrated in the further modification of the signalling device of Figs. 4–6, inclusive, which is shown in Figs. 11 and 12. As shown, the tube 201″, which is approximately twice the length of the tube 201′ of the exemplification shown in Fig. 10 and which is of smaller diameter, is fixedly supported on a pair of short uprights 217 and 218 arranged in spaced relationship on the base 216. A clamp 208 is fixed to one end of the base 216 and an upright 208′ is fixed to the other end of the base 216 for supporting the threaded rod 209 which carries the tension string 202; it being understood, as before, that the tension string 202 extends between the clamp 208 and the rod 209 and that its tension can be increased or decreased as desired by turning up the wing-nut 210 which is threaded onto the rod 209. The driving device for vibrating the tension string 202, and consisting of the winding 203, its iron core 204 and the condenser 205, preferably is supported, in this modification, between the threaded rod 209 and the adjacent end of the tube 201″, as shown. As indicated, the tension wire 202 extends through an air gap between the upper leg 211 of a yoke and the iron core 204. This location of the driving components for vibrating the tension wire 202 will give the greatest vibration to the wire and, consequently, the highest decibel level output with a given power input through the winding 203. Thus, we have shown that the tube 201 can be a full length tube in the sense that its length is equal to the proper fraction of the wave length of the fundamental tone of the frequency superimposed upon the power line or of the fundamental tone of the tensional string 202 and the frequency of the resonant electrical circuit consisting of the components 203, 204 and 205; the tube 201 being varied to either a quarter length, as shown in Fig. 10 and designated by the reference numberal 201′ or to a one-half length, as shown in Figs. 11 and 12 and designated by the reference numeral 201″.

Figure 9:
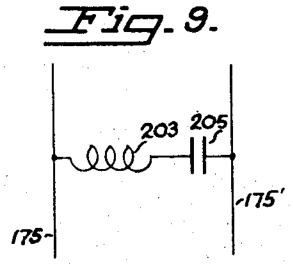
Fig. 9 is a schematic wiring diagram of the electrical circuit of the device shown in Figs. 4 and 5.

The electrical resonant circuit for the exemplifications of signalling devices shown in Figs. 4 to 6 and Figs. 10, 11 and 12, is diagrammatically set out in Fig. 9 of the annexed drawings and illustrates the feeder lines 175 and 175′ which are connected to the secondary of one of the transformers 176, see Fig. 3, across which the condenser 205 and the winding 203 are connected in series. As shown in Fig. 5, the winding 203 and its iron core, as well as the condenser 205, are connected into the line by means of the conventional cord and plug 181. It is, of course, understood that the condenser 205 is introduced into the circuit to render the same electrically resonant at the frequency superimposed upon the power lines. Further, this circuit passes little or no current at 60 cycles. It also is to be understood that condensers of different values may be substituted to tune this circuit to different frequencies whenever desired. The tension string 202 is so constructed that the same mechanically vibrates at the frequency of the circuit superimposed upon the power transmission lines. In Fig. 7, of the annexed drawings, there is shown a development of the tube length for housing the tensional string 202 and its driving device. The particular development shown in Fig. 7 is a ¼ wave length resonator of the type shown in Fig. 10 of the drawings and the pipe or tube length is determined in relation to the sound wave with its loops and nodes as indicated in Fig. 8 of the annexed drawings.

A modified embodiment of signalling device is schematically and diagrammatically illustrated in Figs. 13 and 14 and constitutes another form of a simple home device for connection into the feeder lines of a power transmission line upon which the higher frequency current is superimposed to carry one or more coded signals to be received on the signalling devices. In this modification, the components of the electrical resonant circuit comprise the removable lid 301 of a housing 300, from the inside of which depends an arm 302 which is provided with serrated or roughened surface, not shown, together with a winding 303 with its iron core 304 and a condenser 305. The armature 303 is seated on a yoke 311 which may be fixedly secured to the bottom of housing 300, and we provide a two-element vibrator consisting of a member 321 secured to the top of one leg of yoke 311 and a second member 322 which is riveted or otherwise secured to the top of member 321; the member 322 extending toward and in close proximity to the depending arm 302 of lid 301 of the housing. The vibrating member 321 extends above iron core 304 of the armature 303 from one leg of the yoke 311 toward and in close proximity to the other leg of the yoke 311 leaving an air gap 323 therebetween. When this device is plugged into the feeder lines 175 and 175' by means of the cord and plug 181, see Fig. 3, the electrical energy thus supplied to the armature 303 sets up a maximum vibration of the members 321 and 322 of the vibrating element to cause the outer end of member 322 to move rapidly back and forth over the roughened surface of the depending arm 302, providing, in effect, a buzzer. The circuit for this modification is shown in Fig. 13 with the winding 303 and the condenser 305 connected across the lines 175 and 175'.

A similar device is schematically illustrated in Fig. 15 of the annexed drawings wherein we show the armature 303 and the condenser 305 connected across the conductors 175 and 175' which lead from the feeder lines of the power transmission system, see Fig. 3. In this modification of Fig. 15, we provide a pair of contacts, designated by the reference numeral 315 which are placed in series with the coil 320 of a buzzer, not shown, so that the winding of the relay including the armature 303 and the contacts 315 becomes the reactance of the electrical resonant circuit and the condenser 305 becomes the capacitance of the circuit. This circuit is so tuned that there is a minute amount of 60 cycle current passing at all times. When a higher frequency signal is introduced through the same source as the 60 cycle input, the circuit resonates and the higher frequency current circulates; the relay 303 closes the contacts 315 so that 120 volts 60 cycle current flows through the winding of the buzzer 320 causing the same to respond loudly to the cadence or code of the higher frequency current signal.

A heavier or larger device is contemplated for industrial or institutional use and for connection into the system of our present invention. This industrial or institutional signalling device is shown by wiring diagram in Fig. 16 of the annexed drawings and comprises a resonantly tuned circuit in which the winding of a relay 315 becomes the reactance of the circuit while the condenser 305 is the capacitance of the circuit. This particular circuit is so tuned that there is a small amount of 60 cycle current flowing at all times, and when a higher frequency current impulse is superimposed on the 60 cycle bus of the power distribution system, the circuit resonates and the higher frequency current closes the relay contacts 315' which closes the circuit through the buzzer 320 causing this to translate the imparted signal. Parallel to the winding 320 of the buzzer is a red light which may be installed on the face of the housing, such red light being designated by the reference numeral 325 in Fig. 16 of the drawings, and this red light 325 is turned on and off in cadence with the higher frequency coded signal. Also parallel to the winding 320 of the buzzer is the winding of a slave relay consisting of the winding 352 and a pair of contacts 353 and 354 which contacts close as the buzzer sounds and open when the buzzer is silent. The contact 353 is connected to an apertured receptacle designated by the reference numeral 356 into which may be plugged an external alarm such as existing fire alarm systems of large buildings, hospitals, schools and the like; this receptacle 356 acting as the switch or push-button causing the alarm system to respond in the same cadence with the higher frequency current superimposed signal. The contact 354 is connected into a receptacle designated by the reference numeral 357 and receives a plug connected in turn to a source of 120 volts 60 cycle current in an interrupted cadence; the interruptions being caused by the higher frequency coded signal. A green light 358 may be installed on the front of the housing for the aforementioned units; the light 358 indicating that the device is energized and ready to interpret any incoming signal. This heavier device illustrated in Fig. 16 is capable of supplying up to 30 amperes of 120 volt 60 cycle current in cadence with the higher frequency current superimposed upon the bus lines of the power distribution system.

The showing in Fig. 17 of the annexed drawings is an electrical resonant circuit for an augmented home device wherein the armature 303 and condenser 305 are connected across the lines 175 and 175' leading from the feeder lines through transformers 176 of the bus of the power distribution system; such augmented device including an internal buzzer winding 320 connected to contacts 315 with the latter contacts connected to external receptacles 356 and 357 for receiving the plugs of an external alarm, such as an existing fire alarm system of a larger building, a hospital or school or the like.

While we have illustrated in the accompanying drawings, particularly in Figs. 4–6, 10–12, and 13–17, inclusive, preferred embodiments of home and industrial or institutional signalling devices in various exemplifications, we do not consider that we are to be limited to the specific devices illustrated and described as there are a number of modifications of these home signalling devices, as well as industrial or institutional devices that can be employed with the power distribution system in connection with the superimposed higher frequency current carrying the coded signals. Suffice is it to say that the relays of the terminal signalling devices, of whatever form employed, must be resonantly sensitive to the higher frequency current superimposed on the power distribution lines by the components hereinabove described. Each terminal device preferably comprises a buzzer and a relay wherein the relay closes to actuate the buzzer only when the higher frequency is superimposed on the power line, and the buzzer or reactance of the circuit containing the terminal device is so constructed that the reed or armature of the device mechanically vibrates at this superimposed higher frequency. As is understood, the condenser, which is introduced into the electrical circuit of the terminal device, is of such capacity as to render such electrical circuit electrically resonant at the aforesaid higher frequency. In short, for optimum efficiency, the armature or reed should be mechanically tuned to the same frequency as the condenser or capacitance tunes this electrical circuit.

While we have hereinabove frequently referred to superimposing a higher frequency current on the power transmission lines, without specifying any particular value for such higher frequency, we have successfully operated our improved disaster warning system employing a higher frequency of 540 cycles. It is to be understood, however, that lower or higher frequencies than 540 cycles may be employed which are harmonics of 60 cycles. Because of some induction slippage, the system will not actually be tuned to 540 cycles but something short of that.

It may be observed that in the sub-station component illustrated in Figs. 1 and 3, the arrangement of transformers (reactances) and condensers (capacitances) in the converter circuit form an electrical resonance and that the capacitances are of sufficient value to effect circuit resonance and to permit the flow of 540 cycle current yet trap or block the circulation of 60 cycle current at all times through the control or cadence circuit, see Fig. 2, used in conjunction with the sub-station component.

It is to be understood that the appended claims are to be accorded a range of equivalents commensurate in scope with the advance made over the prior art.

We claim:

1. A disaster warning system comprising, in combination with a source of low frequency current and with transmission lines over which said current is caused to flow, converter means electrically coupled to said transmission lines for converting the low frequency input to a higher frequency output and for superimposing the same on said lines, pulsing means electrically coupled to the output of said converter means to impart any selected one of a plurality of different impulses to said lines at said higher frequency output, automatically operable means electrically connected to said converter means and to said pulsing means for controlling the operation of the same, and a plurality of signalling devices connected into said transmission lines and electrically tuned to said superimposed higher frequency current for response only to the impulse imparted to said lines at said higher frequency.

2. A disaster warning system comprising, in combination with a source of low frequency current and with transmission lines over which said current is caused to flow, converter means interposed between said source and said lines for converting the low frequency input to a higher frequency output and for superimposing the same on said lines, means electrically connected to said converter means for forming an electrical resonance between the higher frequency output of said converter means and the low frequency current flowing through said lines, pulsing means for imparting any selected one of a plurality of different impulses to the higher frequency output of said converter means, and a plurality of signalling devices electrically tuned to the higher frequency output of said converter means and responsive only to said higher frequency current superimposed on said transmission lines.

3. In a disaster warning system, the combination with transmission lines over which a low frequency current is normally caused to flow of: an auxiliary electrical circuit coupled to said transmission lines, means in said auxiliary circuit for converting low frequency input to higher frequency output and for superimposing higher frequency current on said transmission lines, means in said auxiliary circuit for imparting any selected one of a plurality of pulsations on the higher frequency output of said auxiliary circuit to superimpose the same on said transmission lines, and a plurality of signalling devices directly connected to said transmission lines and tuned to said auxiliary electrical circuit so as to be responsive only to the pulsation imparted and superimposed on said transmission lines.

4. In a disaster warning system, transmission lines over which a low frequency current normally is caused to flow, an auxiliary circuit coupled with said transmission lines, means in said auxiliary circuit for forming an electrical resonance between said auxiliary circuit and the circuit containing said transmission lines, means connected into said auxiliary circuit for superimposing a higher frequency current on said transmission lines, and a plurality of signalling devices connected to said transmission lines; said signalling devices being tuned to the same electrical resonance as said auxiliary circuit and being responsive only to higher frequency current superimposed on said transmission lines.

5. A disaster warning system comprising a source of high voltage, low frequency current and transmission lines over which said high voltage, low frequency current is normally caused to flow, an auxiliary circuit coupled with said transmission lines, means in said auxiliary circuit for effecting electrical resonance between the auxiliary circuit and said transmission lines, means in said auxiliary circuit interposed between said source and said transmission lines for converting high voltage low frequency input to a lower voltage higher frequency output, pulsing means connected to said auxiliary circuit for imparting any selected one of a plurality of different impulses to said higher frequency output of said last named means for superimposition onto said transmission lines, and a plurality of signalling devices electrically tuned to said auxiliary circuit and responsive only to the higher frequency superimposed on said transmission lines.

6. A disaster warning system comprising, in combination with a source of low frequency current and with transmission lines over which the low frequency current is normally caused to flow, a sub-station component coupled to said transmission lines and comprising a converter circuit connected to said source, a converter connected into said converter circuit between said source and said transmission lines for converting low frequency input to higher frequency output, and means in said converter circuit for forming an electrical resonance between the same and said transmission lines, a central control component comprising an auxiliary cadence circuit electrically connected to said converter circuit, pulsing means in said cadence circuit for imparting impulses to the higher frequency output of said converter for superimposition on said transmission lines, means in said cadence circuit for controlling the operation of said converter, means in said cadence circuit for controlling the operation of said pulsing means, and a plurality of signalling devices connected to said transmission lines and electrically tuned to said converter circuit for operation solely in response to impulses at said higher frequency superimposed on said transmission lines.

7. In a disaster warning system, the combination with transmission lines over which both low frequency current and high frequency current are caused to flow: of a translating warning device comprising a wire supported under tension, and a driving component for said wire and supported adjacent thereto; said driving component consisting of an electrical circuit connected to said transmission lines and containing a winding, a core therein, and a condenser, said condenser being of sufficient capacity to establish electrical resonance between said circuit and the higher frequency caused to flow through said transmission lines whereby said wire is vibrated in response to impulses imparted to said transmission lines at said higher frequency.

8. A disaster warning system comprising, in combination with a source of high voltage, low frequency current and with transmission lines emanating from a substation and over which said current is caused to flow to a multiplicity of unassociated outlets remote from said source, a substation component comprising electrically operative means electrically connected to said source and to said transmission lines at a substation from which said transmission lines emanate for superimposing upon said transmission lines a lower voltage, higher frequency current independent of said high voltage, low frequency current normally flowing over said transmission lines, a control component situated at a location remote from said substation component; said control component comprising an electrical circuit connected to said electrically operative means and containing elements for regulating the operation of said means and also containing pulsing means for imparting selected pulsed signals to said transmission lines at said lower voltage and higher frequency, and a plurality of signalling devices located at the various outlets of said transmission lines remote from said substation component as well as remote from said control component; said signalling devices each comprising a vibrator, and means for driving said vibrator comprising a tuned circuit electrically connected directly to said transmission lines to cause said vibrator to respond solely to the superimposed lower voltage, higher frequency current.

9. A disaster warning system as defined in claim 8, and means in said electrical circuit of said control component for restricting the responses of said signalling devices to a predetermined number of said signalling devices in a predetermined area.

References Cited in the file of this patent

UNITED STATES PATENTS

| | | |
|---|---|---|
| 958,224 | Carroll | May 17, 1910 |
| 2,248,784 | Roseby | July 8, 1941 |
| 2,275,147 | Hershey | Mar. 3, 1942 |
| 2,319,633 | Roseby | May 18, 1943 |
| 2,348,399 | Mackenzie | May 9, 1944 |
| 2,387,444 | Hayslett | Oct. 23, 1945 |
| 2,498,899 | Saville | Feb. 28, 1950 |
| 2,580,539 | Goodwin | Jan. 1, 1952 |
| 2,647,253 | MacKenzie | July 28, 1953 |
| 2,647,360 | Wagner | Aug. 4, 1953 |
| 2,709,801 | Sprague | May 31, 1955 |
| 2,756,414 | Doremus | July 24, 1956 |